(12) United States Patent
Ranjbar et al.

(10) Patent No.: US 12,269,170 B1
(45) Date of Patent: Apr. 8, 2025

(54) SYSTEMS, METHODS, AND COMPUTER PROGRAM PRODUCTS FOR GENERATING ROBOT TRAINING DATA

(71) Applicant: Sanctuary Cognitive Systems Corporation, Vancouver (CA)

(72) Inventors: Mani Ranjbar, Port Coquitlam (CA); Geoffrey Mantel, Maple Ridge (CA)

(73) Assignee: Sanctuary Cognitive Systems Corporation, Vancouver (CA)

(*) Notice: Subject to any disclaimer, the term of this patent is extended or adjusted under 35 U.S.C. 154(b) by 0 days.

(21) Appl. No.: 18/588,919

(22) Filed: Feb. 27, 2024

(51) Int. Cl.
*B25J 9/16* (2006.01)
*B25J 13/08* (2006.01)
*B25J 19/02* (2006.01)

(52) U.S. Cl.
CPC ............ *B25J 9/1671* (2013.01); *B25J 9/163* (2013.01); *B25J 13/085* (2013.01); *B25J 19/023* (2013.01)

(58) Field of Classification Search
CPC ........ B25J 9/1671; B25J 9/163; B25J 13/085; B25J 19/023; B25J 9/00; B25J 9/16; B25J 9/1664; B25J 9/0081; B25J 9/123; B25J 9/126; B25J 9/1605; B25J 9/1612; B25J 9/1697; G05B 13/04; G05B 17/00; G05B 17/02; G05B 2219/39543
See application file for complete search history.

(56) References Cited

U.S. PATENT DOCUMENTS

| | | | | |
|---|---|---|---|---|
| 11,897,133 B2* | 2/2024 | Levine | ................ | G05B 13/027 |
| 2017/0252922 A1* | 9/2017 | Levine | ................ | G06N 3/084 |
| 2019/0318050 A1* | 10/2019 | Zapolsky | ............ | G01M 17/007 |
| 2021/0205988 A1* | 7/2021 | James | ................ | G05B 19/4155 |
| 2021/0327127 A1* | 10/2021 | Hinterstoisser | ......... | G06T 17/00 |
| 2022/0048191 A1* | 2/2022 | Miller | ...................... | B25J 9/161 |
| 2022/0288782 A1* | 9/2022 | Bennice | .................. | B25J 9/163 |
| 2023/0381959 A1* | 11/2023 | Thomaz | .................. | B25J 9/163 |
| 2024/0070896 A1* | 2/2024 | Hayashi | ................ | G06V 10/44 |
| 2024/0095527 A1* | 3/2024 | Handa | ..................... | G06N 3/08 |

OTHER PUBLICATIONS

Sapp et al., "A Fast Data Collection and Augmentation Procedure for Object Recognition," 2008 (Year: 2008).*

* cited by examiner

*Primary Examiner* — Adam R Mott
*Assistant Examiner* — Byron Xavier Kasper
(74) *Attorney, Agent, or Firm* — Thomas Mahon

(57) ABSTRACT

Systems, methods, and computer program products for generating training data are described. Action data and context data are recorded for a robot body performing an action or task in an environment. The context data is augmented virtually to include variations from the recorded environment while the action data remains unchanged, and instances of training data are generated including the augmentations, to produce a large and varied training data set.

19 Claims, 10 Drawing Sheets

SYSTEMS, METHODS, AND COMPUTER PROGRAM PRODUCTS FOR GENERATING ROBOT TRAINING DATA

TECHNICAL FIELD

The present systems, methods, and computer program products generally relate to robot training data, and in particular relate to generating training data for use in developing robot control systems.

DESCRIPTION OF THE RELATED ART

Robots are machines that may be deployed to perform work. General purpose robots (GPRs) can be deployed in a variety of different environments, to achieve a variety of objectives or perform a variety of tasks. To achieve a level of autonomy, robots can be controlled or guided by a control paradigm based on artificial intelligence or machine learning models. Such artificial intelligence or machine learning models are trained using training data, and can demand a significant quantity and/or variety of such training data.

BRIEF SUMMARY

According to a broad aspect, the present disclosure describes a method comprising: accessing action data, the action data corresponding to at least one action performed by a robot body; accessing context data, the context data at least partially representing an environment of the robot body; generating, by at least one processor, a plurality of augmented environment instances based at least in part on the context data, each augmented environment instance different from the environment of the robot body and from other augmented environment instances in the plurality of augmented environment instances in at least one aspect; and generating, by the at least one processor, a plurality of instances of training data for training at least one model, each instance of training data comprising the action data and a respective augmented environment instance of the plurality of augmented environment instances.

The method may further comprise capturing, by at least one sensor of the robot body, the action data.

The action data may comprise sensor data indicative of the at least one action, the sensor data captured by at least one sensor selected from a group of sensors consisting of: an image sensor which captures image data representing at least a portion of the robot body; a movement sensor which captures movement data for at least one actuatable member of the robot body; a proprioceptive sensor which captures proprioceptive data for at least one actuatable member of the robot body; an inertial sensor which captures inertial data for at least one actuatable member of the robot body; and a force sensor which captures force data for at least one actuatable member of the robot body.

The action data may comprise at least one action instruction or at least one action description indicative of the at least one action.

The method may further comprise capturing, by at least one sensor, the context data.

The environment of the robot body may be a physical environment, and the context data may comprise sensor data at least partially representing the physical environment of the robot body, the sensor data captured by at least one sensor selected from a group of sensors consisting of: an image sensor which captures image data representing the physical environment; an image sensor which captures image data representing at least a portion of the robot body; an image sensor which captures image data representing the physical environment from the perspective of the robot body; a haptic sensor which captures haptic data representing contact between the robot body and the physical environment; an audio sensor which captures audio data representing sound in the physical environment; an infrared sensor which captures infrared data representing the physical environment; and a LIDAR sensor which captures LIDAR data representing the physical environment.

The context data may at least partially represent the environment of the robot body and the robot body in the environment.

Generating the plurality of augmented environment instances based at least in part on the context data may comprise, with the environment at least partially represented in the context data as an environment template: for each augmented environment instance, applying at least one augmentation to the environment template, the at least one augmentation selected from a group of augmentations consisting of: adding at least one visual virtual object to the environment template outside of an action path of the robot body; adding at least one visual virtual object to the environment template which is not pertinent to a work objective of the robot; changing a visual aspect of at least a portion of a background region of the environment template; adding at least one sound to the environment template; removing at least one sound from the environment template; adding at least one haptic feature to the environment template; and removing at least one haptic feature from the environment template. For each augmented environment instance, applying at least one augmentation of the environment template may comprise: autonomously selecting a subset of augmentations from the group of augmentations; and applying the selected augmentations. Autonomously selecting the subset of augmentations from the group of augmentations may further comprise, for each selected augmentation, autonomously selecting an augmentation target in the environment template for the selected augmentation.

The context data may include: chroma key context data corresponding to at least one augmentable region of the environment; and feature context data corresponding to at least one non-augmentable region of the environment. Generating the plurality of augmented environment instances based at least in part on the context data may comprise: for each augmented environment instance, applying at least one augmentation to the at least one augmentable region of the environment, the at least one augmentation selected from a group of augmentations consisting of: adding at least one virtual object to the at least one augmentable region of the environment; and replacing the at least one augmentable region of the environment. The feature context data may correspond to at least a portion of the robot body or at least a portion of an object which the robot body interacts with during the at least one action.

The environment of the robot body may be a virtual environment; the action data may correspond to at least one action performed by the robot body as simulated in the virtual environment; and the context data may at least partially represent the virtual environment.

According to another broad aspect, the present disclosure describes a computer program product comprising at least one non-transitory processor-readable storage medium storing processor-executable instructions or data that, when executed by at least one processor of a processor-based system, cause the processor-based system to: access action data, the action data corresponding to at least one action performed by a robot body; access context data, the context data at least partially representing an environment of the robot body; generate, by the at least one processor, a plurality of augmented environment instances based at least in part on the context data, each augmented environment instance different from the environment of the robot body and from other augmented environment instances in the plurality of augmented environment instances in at least one aspect; and generate, by the at least one processor, a plurality of instances of training data for training at least one model, each instance of training data comprising the action data and a respective augmented environment instance of the plurality of augmented environment instances.

The processor executable instructions or data which cause the processor-based system to generate the plurality of augmented environment instances based at least in part on the context data may cause the at least one processor to, with the environment of the robot body at least partially represented in the context data as an environment template: for each augmented environment instance, apply at least one augmentation to the environment template, the at least one augmentation selected from a group of augmentations consisting of: adding at least one visual virtual object to the environment template outside of an action path of the robot body; adding at least one visual virtual object to the environment template which is not pertinent to a work objective of the robot; changing a visual aspect of at least a portion of a background region of the environment template; adding at least one sound to the environment template; removing at least one sound from the environment template; adding at least one haptic feature to the environment template; and removing at least one haptic feature from the environment template. The processor-executable instructions or data which cause the at least one processor to, for each augmented environment instance, apply at least one augmentation of the environment template may cause the at least one processor to: autonomously select a subset of augmentations from the group of augmentations; and apply the selected augmentations.

The context data may include: chroma key context data corresponding to at least one augmentable region of the environment; and feature context data corresponding to at least one non-augmentable region of the environment. The processor-executable instructions or data which cause the processor-based system to generate the plurality of augmented environment instances based at least in part on the context data may cause the at least one processor to: for each augmented environment instance, apply at least one augmentation to the at least one augmentable region of the environment, the at least one augmentation selected from a group of augmentations consisting of: adding at least one virtual object to the at least one augmentable region of the environment; and replacing the at least one augmentable region of the environment. The feature context data may correspond to at least a portion of the robot body or at least a portion of an object which the robot body interacts with during the at least one action.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

The following description sets forth specific details in order to illustrate and provide an understanding of the various implementations and embodiments of the present systems, methods, and computer program products. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, methods, and control modules.

Figure 1:
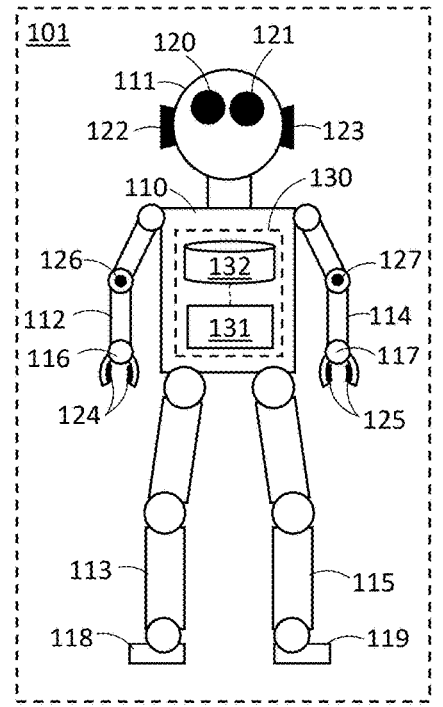
FIGS. 1, 2, and 3 are respective illustrative diagrams of exemplary robot systems comprising various features and components described throughout the present systems, methods, and computer program products.

FIG. 1 is a front view of an exemplary robot system 100 which can be used in any of the implementations discussed herein, such as for generation of training data and/or controlled according to a model trained using such training data. In the illustrated example, robot system 100 includes a robot body 101 that is designed to approximate human anatomy, including a torso 110 coupled to a plurality of components including head 111, right arm 112, right leg 113, left arm 114, left leg 115, right end-effector 116, left end-effector 117, right foot 118, and left foot 119, which approximate anatomical features. More or fewer anatomical features could be included as appropriate for a given application. Further, how closely a robot approximates human anatomy can also be selected as appropriate for a given application, and in some implementations of the present systems, methods, and computer program products a robot body may only resemble a portion of human anatomy (e.g., an arm), or a robot body may not resemble human anatomy at all.

Each of components 110, 111, 112, 113, 114, 115, 116, 117, 118, and 119 can be actuatable relative to other components. Any of these components which is actuatable relative to other components can be called an actuatable member. Actuators, motors, or other movement devices can couple together actuatable components. Driving said actuators, motors, or other movement driving mechanism causes actuation of the actuatable components. For example, rigid limbs in a humanoid robot can be coupled by motorized joints, where actuation of the rigid limbs is achieved by driving movement in the motorized joints.

End effectors 116 and 117 are shown in FIG. 1 as grippers, but any end effector could be used as appropriate for a given application. For example the end effectors can be hand-shaped members having as many or as few degrees of freedom as the contemplated applications require.

Right leg 113 and right foot 118 can together be considered as a support member and/or a locomotion member, in that the leg 113 and foot 118 together can support robot body 101 in place, or can move in order to move robot body 101 in an environment (i.e. cause robot body 101 to engage in locomotion). Left leg 115 and left foot 119 can similarly be considered as a support member and/or a locomotion member. Legs 113 and 115, and feet 118 and 119 are exemplary support and/or locomotion members, and could be substituted with any support members or locomotion members as appropriate for a given application. For example, FIG. 2 discussed later illustrates wheels as exemplary locomotion members instead of legs and feet.

Robot system 100 in FIG. 1 includes a robot body 101 that closely approximates human anatomy, such that input to or control of robot system 100 can be provided by an operator performing an action, to be replicated by the robot body 101 (e.g. via a tele-operation suit or equipment). In some implementations, it is possible to even more closely approximate human anatomy, such as by inclusion of actuatable components in a face on the head 111 of robot body 101, or with more detailed design of hands or feet of robot body 101, as non-limiting examples. However, in other implementations a complete approximation of the human anatomy is not required, and a robot body may only approximate a portion of human anatomy. As non-limiting examples, only an arm of human anatomy, only a head or face of human anatomy; or only a leg of human anatomy could be approximated.

Robot system 100 is also shown as including sensors 120, 121, 122, 123, 124, 125, 126, and 127 which collect context data representing an environment of robot body 101 and/or action data representing performance of at least one action by the robot body 101. In the example, sensors 120 and 121 are image sensors (e.g. cameras) that capture visual data representing an environment of robot body 101. Although two image sensors 120 and 121 are illustrated, more or fewer image sensors could be included. Also in the example, sensors 122 and 123 are audio sensors (e.g. microphones) that capture audio data representing an environment of robot body 101. Although two audio sensors 122 and 123 are illustrated, more or fewer audio sensors could be included. In the example, haptic (tactile) sensors 124 are included on end effector 116, and haptic (tactile) sensors 125 are included on end effector 117. Haptic sensors 124 and 125 can capture haptic data (or tactile data) when objects in an environment are touched or grasped by end effectors 116 or 117. Haptic or tactile sensors could also be included on other areas or surfaces of robot body 101. Also in the example, proprioceptive sensor 126 is included in arm 112, and proprioceptive sensor 127 is included in arm 114. Proprioceptive sensors can capture proprioceptive data, which can include the position(s) of one or more actuatable member(s) (e.g., as sensed by one or more joint encoders) and/or force-related aspects of touch, such as force-feedback, resilience, or weight of an element, as could be measured by a torque or force sensor (acting as a proprioceptive sensor) of an actuatable member which causes touching of the element. "Proprioceptive" aspects of touch which can also be measured by a proprioceptive sensor can also include kinesthesia, motion, rotation, or inertial effects experienced when a member of a robot touches an element, as can be measured by sensors such as an Inertial measurement unit (IMU), and accelerometer, a gyroscope, or any other appropriate sensor (acting as a proprioceptive sensor).

Four types of sensors are illustrated in the example of FIG. 1, though more or fewer sensor types could be included. For example, other sensor types, such as accelerometers, inertial sensors, gyroscopes, temperature sensors, humidity sensors, pressure sensor, radiation sensors, or any other appropriate types of sensors could be included. Further, although sensors 120 and 121 are shown as approximating human eyes, and sensors 122 and 123 are shown as approximating human ears, sensors 120, 121, 122, and 123 could be positioned in any appropriate locations and have any appropriate shape.

Throughout this disclosure, reference is made to "haptic" sensors, "haptic" feedback, and "haptic" data. Herein, "haptic" is intended to encompass all forms of touch, physical contact, or feedback. This can include (and be limited to, if appropriate) "tactile" concepts, such as texture or feel as can be measured by a tactile sensor. Unless context dictates otherwise, "haptic" can also encompass "proprioceptive" aspects of touch.

Robot system 100 is also illustrated as including at least one processor 131, communicatively coupled to at least one non-transitory processor-readable storage medium 132. The at least one processor 131 can control actuation of components 110, 111, 112, 113, 114, 115, 116, 117, 118, and 119; can receive and process data from sensors 120, 121, 122, 123, 124, 125, 126, and 127, among other possibilities. The at least one non-transitory processor-readable storage medium 132 can have processor-executable instructions or data stored thereon, which when executed by the at least one processor 131 can cause robot system 100 to perform actions or tasks. Further, the at least one non-transitory processor-readable storage medium 132 can store sensor data or any other data as appropriate for a given application. The at least one processor 131 and the at least one processor-readable storage medium 132 together can be considered as components of a "robot controller" 130, in that they control operation of robot system 100 in some capacity. While the at least one processor 131 and the at least one processor-readable storage medium 132 can perform all of the respective functions described in this paragraph, this is not necessarily the case, and the "robot controller" 130 can be or include components that are remote from robot body 101 either in addition to or in lieu of components on-board robot body 101. In particular, certain functions can be performed by at least one processor or at least one non-transitory processor-readable storage medium remote from robot body 101, as discussed later with reference to FIG. 3.

Figure 2:
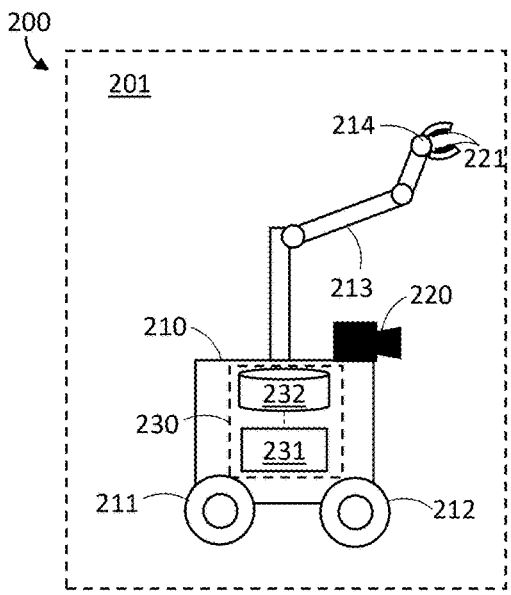

In some implementations, it is possible for a robot body to not approximate human anatomy. FIG. 2 is an elevated side view of a robot system 200 including a robot body 201 which does not approximate human anatomy. Robot body 201 includes a base 210, having actuatable components 211, 212, 213, and 214 coupled thereto. In the example, actuatable components 211 and 212 are wheels (locomotion members) which support robot body 201, and provide movement or locomotion capabilities to the robot body 201. Actuatable components 213 and 214 are a support arm and an end effector, respectively. The description for end effectors 116 and 117 in FIG. 1 is applicable to end effector 214 in FIG. 2. End effector 214 can also take other forms, such as a hand-shaped member. In other examples, other actuatable components could be included.

Robot system 200 also includes sensor 220, which is illustrated as an image sensor. Robot system 200 also includes a haptic sensor 221 positioned on end effector 214. The description pertaining to sensors 120, 121, 122, 123, 124, 125, 126, and 127 in FIG. 1 is also applicable to sensors 220 and 221 in FIG. 2 (and is applicable to inclusion of sensors in robot bodies in general). End effector 214 can be used to touch, grasp, or manipulate objects in an environment. Further, any number of end effectors could be included in robot system 200 as appropriate for a given application or implementation.

Robot system 200 is also illustrated as including a local or on-board robot controller 230 comprising at least one processor 231 communicatively coupled to at least one non-transitory processor-readable storage medium 232. The at least one processor 231 can control actuation of components 210, 211, 212, 213, and 214; and can receive and process data from sensors 220 and 221, among other possibilities. The at least one non-transitory processor-readable storage medium 232 can store processor-executable instructions or data that, when executed by the at least one processor 231, can cause robot body 201 to perform any appropriate action or operation. Further, the at least one processor-readable storage medium 232 can store sensor data or any other data as appropriate for a given application.

Figure 3:
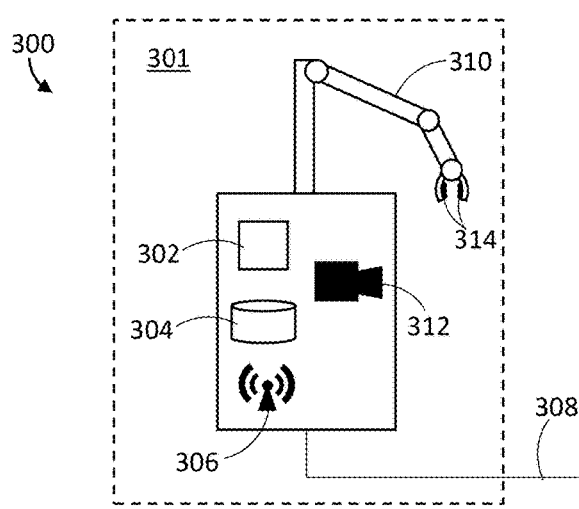
Figure 3:
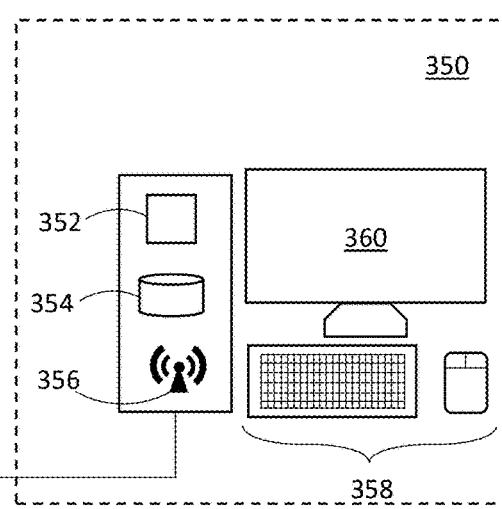

FIG. 3 is a schematic diagram illustrating components of a robot system 300 comprising a robot body 301 and a physically separate remote device 350 in accordance with the present robots and methods.

Robot body 301 is shown as including at least one local or on-board processor 302, a non-transitory processor-readable storage medium 304 communicatively coupled to the at least one processor 302, a wireless communication interface 306, a wired communication interface 308, at least one actuatable component 310, at least one sensor 312, and at least one haptic sensor 314. However, certain components could be omitted or substituted, or elements could be added, as appropriate for a given application. As an example, in many implementations only one communication interface is needed, so robot body 301 may include only one of wireless communication interface 306 or wired communication interface 308. Further, any appropriate structure of at least one actuatable portion could be implemented as the actuatable component 310 (such as those shown in FIGS. 1 and 2, for example). For example, robot body 101 as described with reference to FIG. 1, or robot body 201 described with reference to FIG. 2, could be used in place of robot body 301, and communication interface 306 or communication interface 308 could be implemented therein to enable communication with remote device 350. Further still, the at least one sensor 312 and the at least one haptic sensor 314 can include any appropriate quantity or type of sensor, as discussed with reference to FIGS. 1 and 2.

Remote device 350 is shown as including at least one processor 352, at least one non-transitory processor-readable medium 354, a wireless communication interface 356, a wired communication interface 308, at least one input device 358, and an output device 360. However, certain components could be omitted or substituted, or elements could be added, as appropriate for a given application. As an example, in many implementations only one communication interface is needed, so remote device 350 may include only one of wireless communication interface 356 or wired communication interface 308. As another example, input device 358 can receive input from an operator of remote device 350, and output device 360 can provide information to the operator, but these components are not essential in all implementations. For example, remote device 350 can be a server which communicates with robot body 301, but does not require operator interaction to function. Additionally, output device 360 is illustrated as a display, but other output devices are possible, such as speakers, as a non-limiting example. Similarly, the at least one input device 358 is illustrated as a keyboard and mouse, but other input devices are possible.

In some implementations, the at least one processor 302 and the at least one processor-readable storage medium 304 together can be considered as a "robot controller", which controls operation of robot body 301. In other implementations, the at least one processor 352 and the at least one processor-readable storage medium 354 together can be considered as a "robot controller" which controls operation of robot body 301 remotely. In yet other implementations, that at least one processor 302, the at least one processor 352, the at least one non-transitory processor-readable storage medium 304, and the at least one processor-readable storage medium 354 together can be considered as a "robot controller" (distributed across multiple devices) which controls operation of robot body 301. "Controls operation of robot body 301" refers to the robot controller's ability to provide instructions or data for operation of the robot body 301 to the robot body 301. In some implementations, such instructions could be explicit instructions which control specific actions of the robot body 301. In other implementations, such instructions or data could include broader instructions or data which guide the robot body 301 generally, where specific actions of the robot body 301 are controlled by a control unit of the robot body 301 (e.g. the at least one processor 302), which converts the broad instructions or data to specific action instructions. In some implementations, a single remote device 350 may communicatively link to and at least partially control multiple (i.e., more than one) robot bodies. That is, a single remote device 350 may serve as (at least a portion of) the respective robot controller for multiple physically separate robot bodies 301.

A robot controller (such as those described in FIGS. 1, 2, and 3) can to varying degrees employ artificial intelligence or machine learning models to control operation of a robot body. For example, one or more artificial intelligence and/or machine learning models may enable a robot body to perform one or more tasks autonomously or substantially autonomously. As a non-limiting example, a machine learning model or plurality of machine learning models can be trained in order to execute various control routines or instructions, which cause a robot body to perform one or more actions. Once trained, the robot body can be deployed, and be capable of executing such control routines or instructions, in order to execute the one or more actions as appropriate in applicable scenarios.

One means for controlling a robot body is a Large Behavior Model (LBM) or Large Action Model (LAM). While there may be some differences in implementation between certain LBMs and certain LAMs, for the purpose of concision both are referred to interchangeably and collectively as LBMs herein. LBMs generally receive context data as input, and output behavior. For example, context data can include sensor data from various sensors at a robot body. As other examples, context data can be information about context of the robot body (e.g. gathered by sensors external to the robot body or from information databases). Based on this context data, the LBM can output appropriate behavior (e.g. actions or instructions for the robot body), that are appropriate for responding or otherwise acting in the context.

To optimally train an LBM, a large amount of training data is preferred. In the present disclosure, for LBMs, training data corresponds to recorded instances of a robot performing one or more task(s). For example, to train an LBM to enable a robot to execute a certain task, training data of the robot (or a similar robot) successfully performing the task is used. Such training data can take a variety of forms, including sensor data recorded by the robot as it performs the task, or externally captured data representing the robot performing the task (such as image data which visually shows the robot performing the task). This methodology can be referred to as "Behavior Cloning". To produce a recorded instance of a robot performing one or more tasks, the robot can be controlled by tele-operation, where the robot body is controlled by input from a tele-operation system, as discussed in detail later with reference to FIG. 14.

If training data is limited, the resulting LBM may be not be very robust or flexible, and may produce erroneous outputs with slight changes in situation, even if the changes have no immediate relevance to the desired outputs. That is, if an LBM is trained based on data in a highly controlled environment, minimal differences which appear in a less controlled environment (e.g. in a practical scenario or deployment) can influence outputs by the LBM. As an example scenario: an LBM is trained by behavior cloning to interact with an object on a table. The training data used for behavior cloning is limited to a robot successfully interacting with the object in an open space (i.e. with no visual distractions in the background). Once applied in a practical context, there can be distractions in the input data to the LBM. For example, a clock on a wall in the environment of the robot can appear in input data to the LBM, which can result in erroneous output by the LBM (since the LBM is not trained in how to handle, or trained to be robust against, such information). For example, one or more visual sensors of the robot body may detect the clock and one or more feature extractors of the robot system may confuse the clock with the object on the table. In this example, despite the clock having no physical impact on the ability of the robot to interact with the object on the table, the clock still affects the output of the LBM and thus affects operation of the robot.

To address this issue, it is desirable to train an LBM using a large corpus of data, where each instance of data includes variations (even subtle variations) in aspects which, to a human, have no tangible impact on the ability to perform the desired behavior. However, recording instances of training data at a large scale is difficult and resource intensive. In the example of an operation where a robot is to interact with an object on a table, the robot, object, and table would have to be set up. The interaction would then need to be performed, and appropriate data recorded. This would capture a single instance of training data. Afterwards, the robot and object would need to be reset, and some variation would need to be introduced (e.g. adding an object to a background (such as a clock on the wall that was not there before), setting up the scenario in a different location, etc.) In order to record a significant amount of differences, this would be exceedingly time and resource consuming, would cause significant wear-and-tear to the robot, and/or would require a significant quantity of robots (which are expensive and scarce).

To address these issues, the present disclosure is directed to data augmentation, where a given instance of recorded training data can be multiplied into a plurality of varied instances of training data quickly and efficiently.

Figure 4:
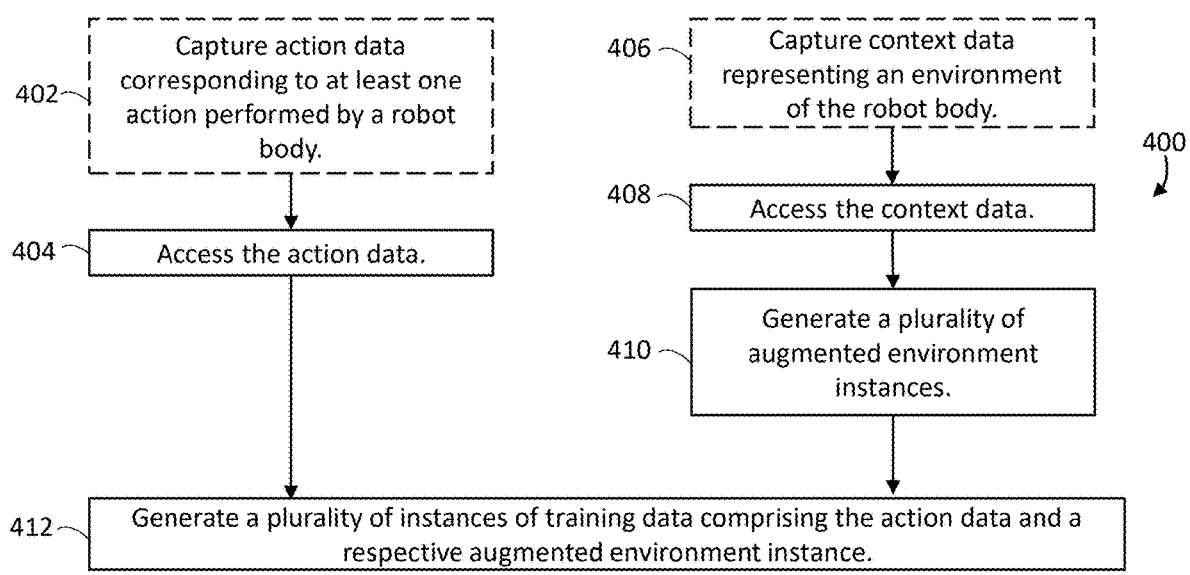
FIG. 4 is a flowchart diagram which illustrates a method of generating training data, in accordance with at least one exemplary illustrated implementation.
Figure 5:
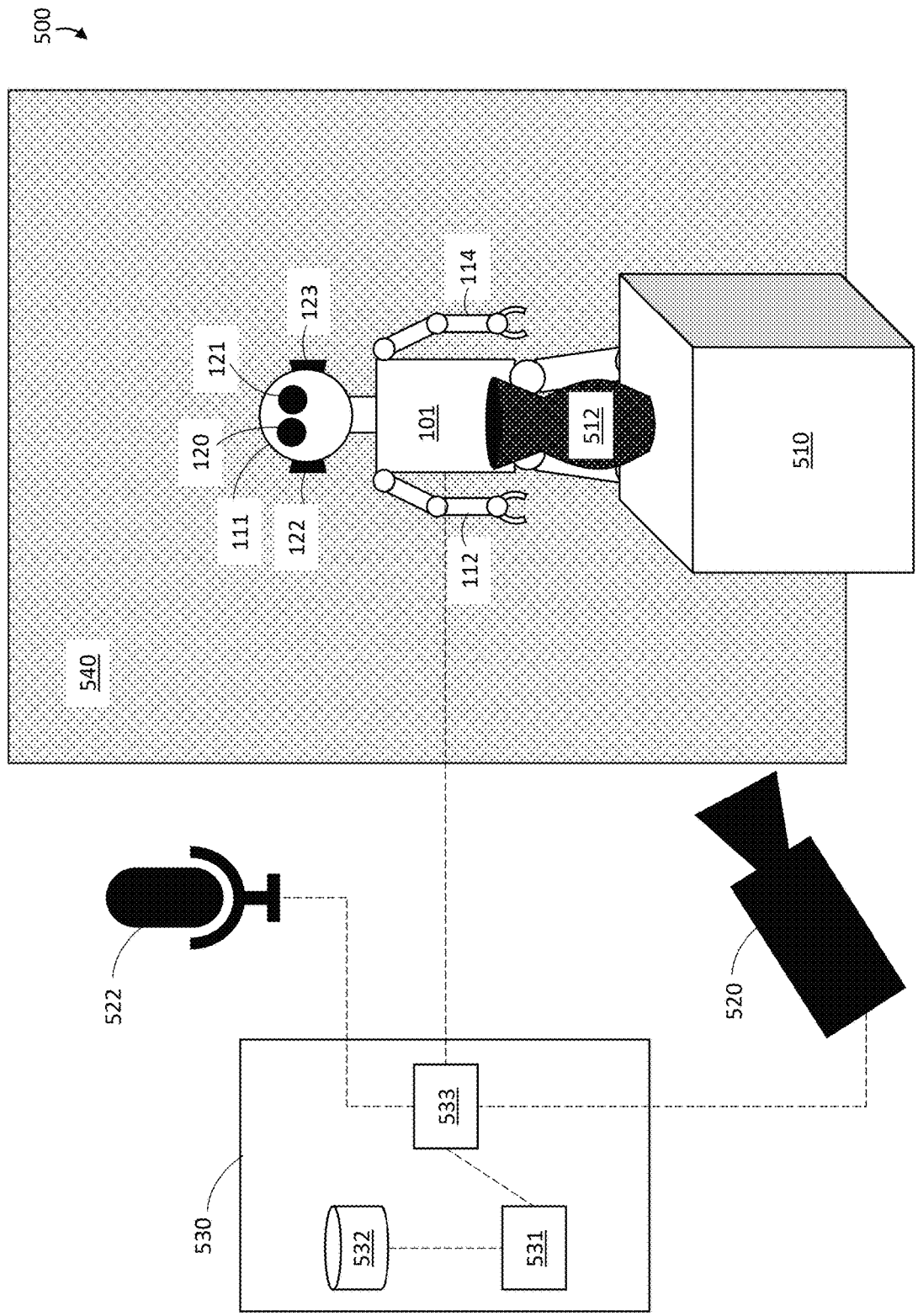
FIGS. 5, 6, and 7 are scene views which illustrate an exemplary scenario for sourcing action data and context data, for generating training data.
Figure 6:
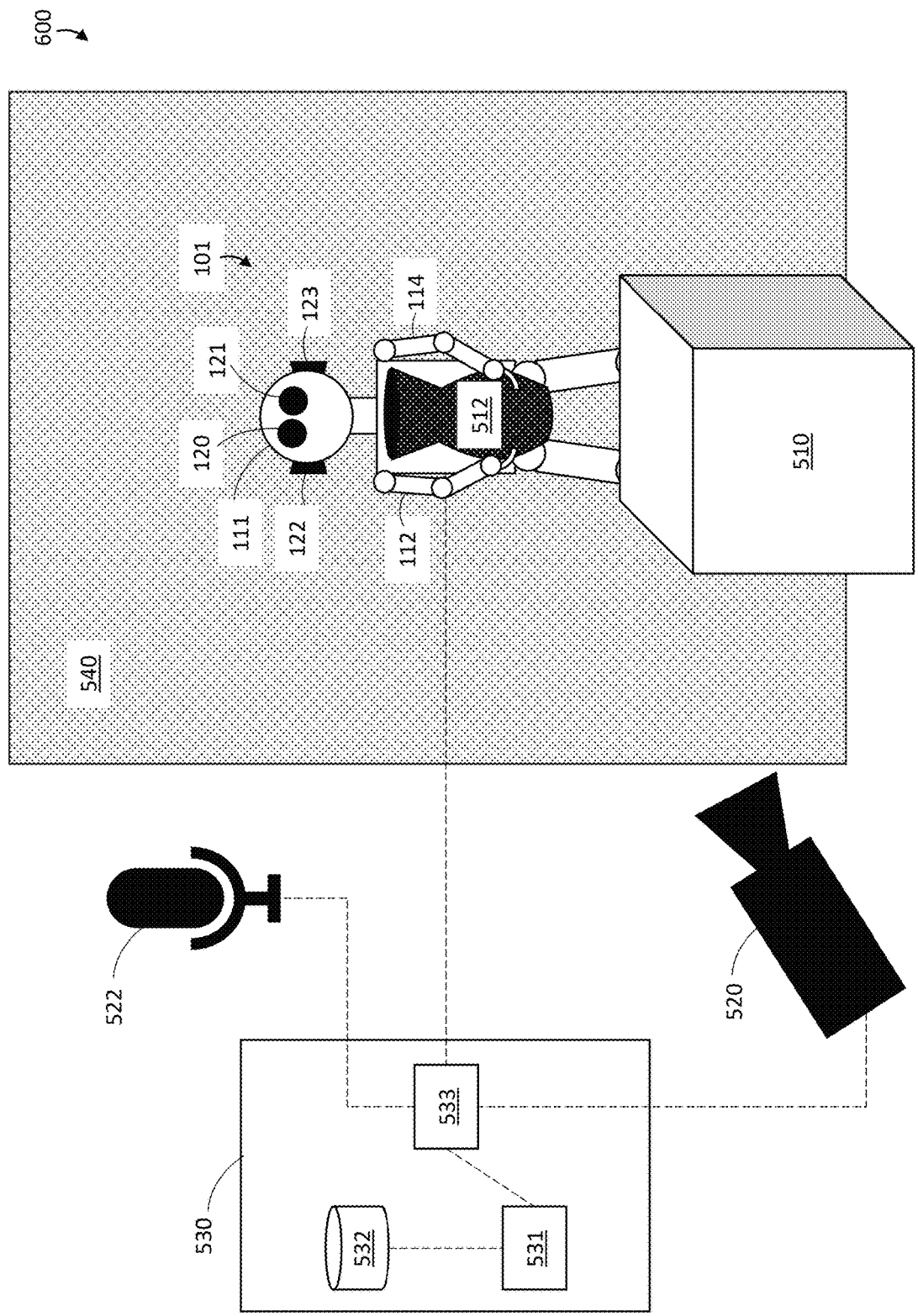
Figure 7:
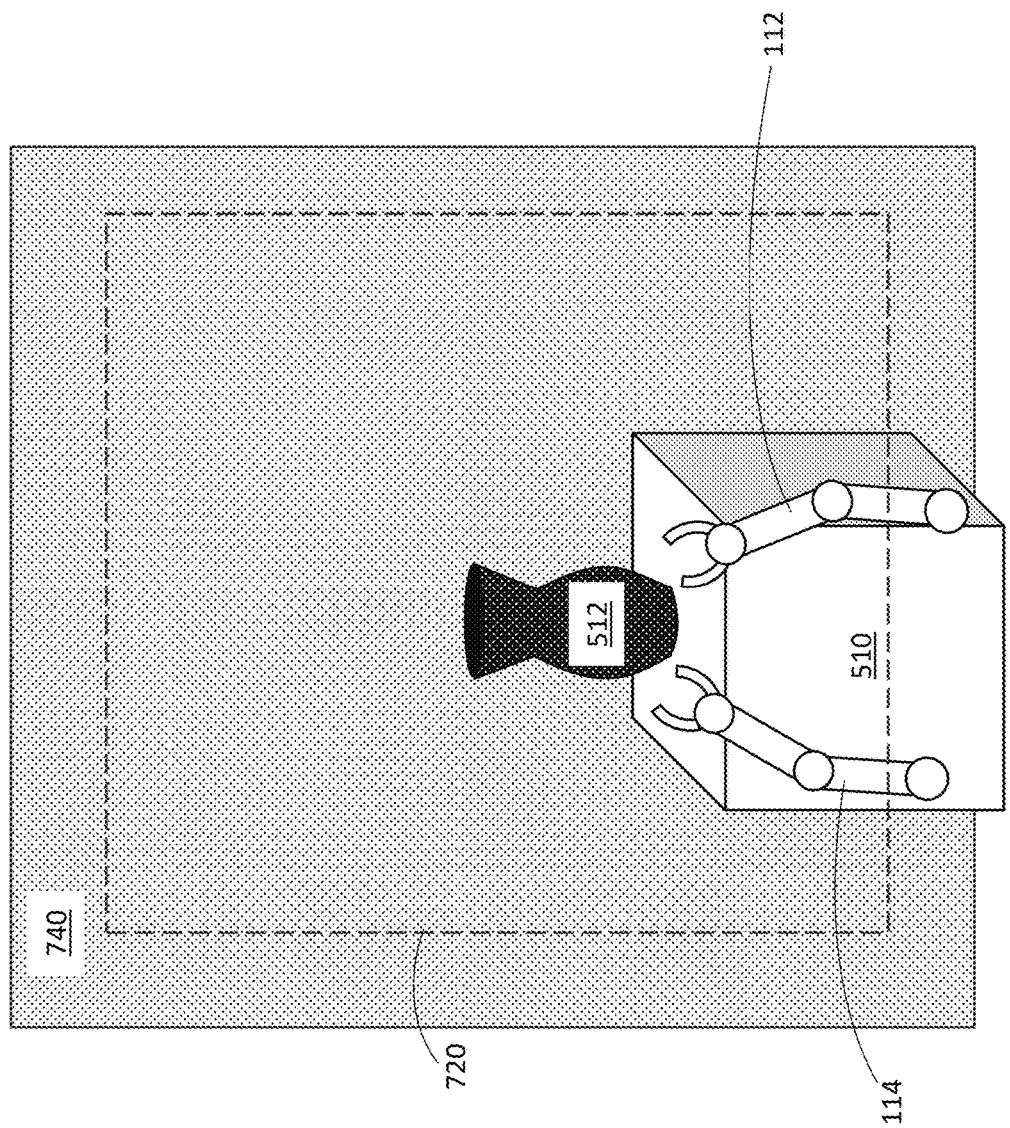

FIG. 4 is a flowchart diagram showing an exemplary method 400 of generating training data in accordance with the present systems, methods, and computer program products. Method 400 is performed by a system which includes at least one processor. The system can include at least one non-transitory processor-readable storage medium storing data and/or processor-executable instructions that, when executed by the at least one processor, cause the system to perform the method 400. The method 400 can also be implemented as a computer program product, comprising at least one non-transitory processor-readable storage medium storing processor-executable instructions or data, which when executed by at least one processor of a processor-based system, cause the processor-based system to perform the method 400. Method 400 is discussed in tandem with exemplary scenarios and instances shown in FIGS. 5, 6, 7, 8, 9, 10, 11, 12, and 13. The scenarios and instances in FIGS. 5, 6, 7, 8, 9, 10, 11, 12, and 13 are merely exemplary, and method 400 can be used in any appropriate application or context. FIGS. 5, 6, and 7 in particular discuss exemplary hardware which can be used in an exemplary implementation of method 400.

Method 400 as illustrated includes acts 402, 404, 406, 408, 410, and 412, though those of skill in the art will appreciate that in alternative implementations certain acts may be omitted and/or additional acts may be added. For example, acts 402 and 406 are optional acts that may be excluded from the scope of method 400 as appropriate for a given application. Those of skill in the art will also appreciate that the illustrated order of the acts is shown for exemplary purposes only and may change in alternative implementations. For example, acts 402 and 404 can be performed in any appropriate timing relative to acts 406, 408, and 410 (e.g. before, after, concurrently).

FIGS. 5 and 6 are scene views of instants 500 and 600, respectively, of a particular situation where method 400 can be performed.

FIGS. 5 and 6 show robot body 101 as described earlier with reference to FIG. 1, and not repeated for brevity. Some features of robot body 101 are not shown or labelled in FIGS. 5 and 6 to reduce clutter. Robot body 101 in FIGS. 5 and 6 can be replaced by any robot body, such as robot body 201 in FIG. 2 or robot body 301 in FIG. 3, or any other robot body as appropriate.

FIG. 5 shows a pedestal 510 with an object (i.e., a vase in this illustrative example) 512 positioned thereon. FIGS. 5 and 6 illustrate a scenario where robot body 101 is being recorded, as it performs an action of picking up vase 512. FIG. 5 shows an instant prior to robot body 101 picking up vase 512, and FIG. 6 shows a successful result where robot body 101 has picked up and is holding vase 512 above pedestal 510, by right arm 112 and left arm 114. This scenario and action are merely exemplary, and any appropriate action can be performed to record training data. The recorded performance of the action is later augmented as discussed later with reference to act 410, to produce multiple instances of training data as discussed later with reference to act 412.

Optionally, for ease of later augmentation, robot body 101 in FIGS. 5 and 6 is positioned in front of a chroma key object 540. As examples, chroma key object 540 could be a "blue screen", "green screen", or any other appropriate screen color, which is distinct from a color or robot body 101. Chroma key object 540 is not limited to being a fabric "screen", and can be any appropriate material (e.g. a painted or colored board). In this way, background behind robot body 101 can be more easily identified and augmented or virtually replaced. However, the use of chroma key object 540 is optional. In particular, in some implementations, only context data from a perspective of the robot body 101 (egocentric data) is augmented, such that a background behind robot body 101 (and thus out of view of image sensors of the robot body 101) is not important. Further, more than one chroma key object 540 can be used (e.g. to provide a chroma key object for multiple perspectives captured by multiple image sensors). FIG. 7 discussed later shows an alternative chroma key region in this regard.

FIGS. 5 and 6 show multiple sensors which can capture various forms of data. The illustrated sensors include image sensors 120 and 121 of robot body 101 which capture egocentric image data from a perspective of robot body 101, and audio sensors 122 and 123 of robot body 101 which capture egocentric audio data from the perspective of robot body 101. The illustrated sensors further include sensors separate from robot body 101, including image sensor 520 which captures image data representing an environment of robot body 101 (e.g. pedestal 510, vase 512, and chroma key object 540), and audio sensor 522 which captures audio data represent the environment of robot body 101. All of these sensors are not necessarily required in the context of method 400, and some sensors can be omitted. Further, additional sensors can be included which are not shown in FIGS. 5 and 6 (such as at least one or more of proprioceptive sensors, inertial sensors, for sensors, haptic sensors, IR sensors, LIDAR sensors, etc. as discussed earlier with reference to FIG. 1). Further still, multiple sensors of each type can be included (e.g. multiple image sensors 520 or audio sensors 522).

FIGS. 5 and 6 illustrate a device 530, which performs generation of the augmented training data in the example. Device 530 as shown includes at least one processor 531, at least one non-transitory processor-readable storage medium 532, and at least one communication interface 533. The communication interface can for example be a wired communication interface, or a wireless communication interface. Further, device 530 can be in close proximity to robot body 101 (e.g. in the same room or facility), or can be remote from robot body 101 (e.g. device 530 can be a server accessible via the internet or other network). Further still, device 530 is not limited to a single device, but can also comprise a plurality of devices, such as a cloud computing system. In this sense, the at least one processor 531 can comprise a plurality of processors and a plurality of non-transitory processor-readable storage mediums 532 (possibly split across multiple devices).

Communication interface 533 is optional. For example, instead of relying on communication interface 533, data (e.g. action data or context data) can be provided to device 530 in other ways, such as via removable storage media (e.g. USB drive, portable hard drive, data discs, or any other appropriate data transfer means).

In some cases, device 530 can be part of the robot system (e.g. device 530 can be akin to remote device 350 discussed with reference to FIG. 3). In other cases, device 530 is a separate device which is removed from the robot system.

In other implementations, method 400 can be performed by a robot controller. With reference to FIG. 1, action and context data can be captured by appropriate sensors of robot body 101. Accessing of data and acts of generation can be performed by the at least one processor 131. Storage of data can be performed by the at least one non-transitory processor-readable storage medium 132. Further, the at least one non-transitory processor-readable storage medium 132 can store processor-executable instructions or data which, when executed by the at least one processor 131 cause robot body 101 or components thereof to perform acts of method 400.

FIG. 7 is a scene view of the scenario shown in FIG. 5, from the perspective of robot body 101 (an egocentric perspective). In particular, FIG. 7 illustrates a field of view 720 of at least one of image sensors 120 and 121 of robot body 101 (and can represent a composite binocular field of view of both image sensors 120 and 121). Field of view 720 includes representations of right arm 112 and left arm 114 of robot body 101, as well as a portion of pedestal 510 and vase 512. Field of view 720 also includes a partial representation of a chroma key object 740 positioned behind pedestal 510 and vase 512 (in the perspective of FIG. 7). In this way, chroma key object 740 is effective for egocentric image data captured at the robot body. The description of chroma key object 540 above is fully applicable to chroma key object 740, except that chroma key object 740 is positioned differently.

Returning to method 400, at 402, action data is captured. The action data corresponds to at least one action performed by the robot body.

Act 402 is optional, in that action data is not necessarily data which needs to be "captured". For example, the action data could comprise instruction data which includes at least one instruction for the action performed by the robot body. As another example, the action data could comprise at least one action description indicative of the at least one action. As another example, device 530 may receive the action data over the internet, a network, or a removeable storage medium, as examples, but sensors which capture the data are not necessarily within the scope of the method. In other implementations, the scenario shown in FIGS. 5 and 6 may be virtually simulated, such that action data may not actually be "captured" but rather "simulated".

Where act 402 is included in method 400, the action data comprises at least sensor data indicative of at least one action. In some implementations, the action data can be captured by at least one sensor of the robot body (e.g. sensors 120, 121, 122, 123 or other appropriate sensors). The action data may advantageously comprise or consist of egocentric data from the robot's perspective. In some implementations, the action data can be captured by at least one sensor separate from the robot body (e.g. sensors 520, 522, or other appropriate sensors). In some implementations, the action data can include data captured by a plurality of sensors, including sensors at the robot body and/or sensors separate from the robot body.

In some implementations, the action data comprises image data representing at least a portion of the robot body. For example, the action data can comprise egocentric image data captured by image sensors 120 or 121 from the perspective of robot body 101, which shows right arm 112 and/or right arm 114 relative to vase 512 (e.g. as robot body 101 grabs vase 512), similar to as shown in FIG. 7. As another example, the action data can comprise image data captured by image sensor 520, showing robot body 101 relative to vase 512 (as robot body 101 grabs vase 512).

In some implementations, the action data comprises movement data for at least one actuatable member of the robot body, as captured by at least one movement sensor. For example, displacement or rotation sensors (e.g., encoders) can be positioned at joints or members of right arm 112 and left arm 114, which output displacement, position, or rotation data indicative of relative positioning and orientation of elements of right arm 112 and left arm 114. This data over time is indicative of movement of right arm 112 and left arm 114, as the vase 512 is grabbed and picked up.

In some implementations, the action data comprises proprioceptive data for at least one actuatable member of the robot body, as captured by at least one proprioceptive sensor (or force data for at least one actuatable member of the robot body, as captured by at least one force sensor). For example, force feedback or torque sensors can be positioned at joints or members of right arm 112 and left arm 114, which output proprioceptive data indicative of actuation of right arm 112 and left arm 114 as the vase 512 is grabbed and picked up.

In some implementations, the action data comprises inertial data for at least one actuatable member of the robot body, as captured by at least one inertial sensor (e.g. accelerometer or IMU). For example, inertial sensors can be positioned at joints or members of right arm 112 and left arm 114, which output inertial data indicative of motion of right arm 112 and left arm 114 as the vase 512 is grabbed and picked up.

Returning to method 400, in act 404 the action data is accessed.

In examples where the action data includes data which is captured at act 402, accessing the action data as in act 404 comprises receiving the action data from the sensors which captured the action data. Throughout this disclosure, actions of "receiving" data can comprise any appropriate processes for intaking such data, such as formatting, decompressing, routing, or otherwise making the data usable by the device which receives the data. In FIGS. 5 and 6, the action data as captured (e.g. by any of sensors 120, 121, 122, or 123 at the robot body, sensor 520, sensor 522, or any other sensors) is received by communication interface 533.

In examples where the action data includes data which is not "captured" by the described sensors, accessing the action data can comprise retrieving the action data from storage (e.g. at the at least one non-transitory processor-readable storage medium 532 or another datastore accessible to device 530), or receiving the data from a removable storage device.

In some implementations, accessing the action data includes both receiving data which is "captured" as described earlier, and accessing data which is not "captured" as described earlier.

Returning to method 400, at 406, context data is captured. The context data at least partially represents an environment of the robot body.

Act 406 is optional, and in some implementations is outside of the scope of method 400. In some implementations, the context data may be provided separately to a device performing method 400. For example, device 530 may receive the context data over the internet, a network, or a removeable storage medium, as examples, but sensors which capture the data are not necessarily within the scope of the method. In other implementations, the scenario shown in FIGS. 5 and 6 may be virtually simulated, such that context data is not actually "captured".

Where act 406 is included in method 400, the robot body is physical and is positioned in a physical environment, and the context data comprises at least sensor data representing the physical environment of the robot body. In some implementations, the context data can be egocentric and captured by at least one sensor of the robot body (e.g. sensors 120, 121, 122, 123 or other appropriate sensors). In some implementations, the context data can be captured by at least one sensor separate from the robot body (e.g. sensors 520, 522, or other appropriate sensors). In some implementations, the context data can include data captured by a plurality of sensors, including sensors at the robot body and/or sensors separate from the robot body.

In some implementations, the context data comprises image data representing at least a portion of the physical environment. In some cases this image data can be from a perspective of the robot body (i.e., egocentric). For example, the context data can comprise image data captured by image sensors 120 or 122 from the perspective of robot body 101, which shows vase 512 and/or pedestal 510 (similar to as shown in FIG. 7). In some cases the image data can be from a perspective separate from the robot body. As an example, the context data can comprise image data captured by image sensor 520, showing vase 512 and/or pedestal 510.

In some examples the context data comprises image data representing at least a portion of the robot body (e.g. image data captured by image sensors 120, 122, or 520 as discussed above can show robot body 101 in the environment or relative to elements in the environment). In some implementations the context data at least partially represents both the environment of the robot body, and the robot body in the environment.

In some implementations, the context data comprises haptic data (inclusive of tactile data) representing contact between the robot body and the physical environment, as captured by at least one haptic sensor. For example, at least one haptic sensor (such as sensors 124 and 125 in FIG. 1) can capture haptic data representing touch of the environment or objects in the environment (e.g. vase 512) by the end effectors of right arm 112 and/or left arm 114. In some cases, haptic data can represent a weather effect in the environment. For example, rain landing on the robot body can be detected by at least one haptic sensor of the robot body. As another example, wind blowing against the robot body can be detected by at least one haptic sensor of the robot body.

In some implementations, the context data comprises audio data representing sound in the physical environment, as captured by at least one audio sensor. For example, at least one audio sensor (such as sensors 122, 123, and/or 522 in FIGS. 5 and 6) can capture audio data representing sound in the environment. In some cases, the audio data can be indicative of an environment type of the robot body (e.g. the audio data may include factory-related noise, indicative of the environment being a factory, as a non-limiting example). In some cases, audio data can represent a weather effect in the environment. For example, rain or wind noise can be detected by at least one audio sensor.

The image sensors discussed herein can be intended for capturing light in the spectrum visible to humans. However, other forms of image sensor are also possible, including image sensors which employ active light sources to illuminate the environment. As one example, an image sensor can include an infrared sensor, which captures image data in the infrared region. In this regard, the context data can include infrared data representing the physical environment, as captured by an infrared sensor. As another example, an image sensor can be that of a LIDAR system or device, where at least one laser provides illumination, and an image sensor is tailored to capture the illumination light. In this regard, the context data can include LIDAR data representing the physical environment, as captured by a LIDAR sensor.

Returning to method 400, in act 408 the context data is accessed.

In examples where the context data includes data which is captured at act 406, accessing the context data as in act 408 comprises receiving the context data from the sensors which captured the context data. In FIGS. 5 and 6, the context data as captured (by any of sensors at the robot body, sensor 520, or sensor 522) is received by communication interface 533 of device 530.

In examples where capturing the context data is outside the scope of the method, accessing the context data can comprise retrieving the context data from storage (e.g. at the at least one non-transitory processor-readable storage medium 532 or another datastore accessible to device 530), or receiving the data from a removable storage device. In examples where generation of training data is performed in a virtual environment, accessing the context data can comprise generating the context data or retrieving the context data from storage.

In some implementations, accessing the context data includes both receiving data which is "captured" as described earlier, and accessing data which is not "captured" as described earlier (e.g. retrieving context data from storage).

Returning to method 400, at 410, a plurality of augmented environment instances are generated. This generation is performed by at least one processor (e.g. processor 531 of device 530 in FIGS. 5 and 6). The augmented environment instances are generated based at least in part on the context data accessed at 408. Each augmented environment instance includes at least one element that is different from the actual (i.e., recorded) environment of the robot body, and different from each other augmented environment instance in the plurality of augmented environment instances, in at least one aspect. Several examples of generating augmented environment instances are discussed below with reference to FIGS. 8, 9, 10, 11, 12, and 13.

Generally speaking, an environment as represented in the context data accessed at 408 is used as an environment template, and augmented environment instances are generated by applying at least one augmentation to the environment template.

FIGS. 8-13 are scene views of respective augmented environment instances. Each instance is based on the situation shown in FIGS. 5, 6, and 7, where robot body 101 is positioned proximate a pedestal 510 having a vase 512 positioned thereon, and the robot body has a work objective to pick up vase 512 (to collect training data for the action of picking up an object on a surface). In the illustrative examples, the environment as shown in FIGS. 5, 6, and 7 is used as an environment template, and augmented environment instances are generated by applying at least one augmentation to the environment template.

Figure 8:
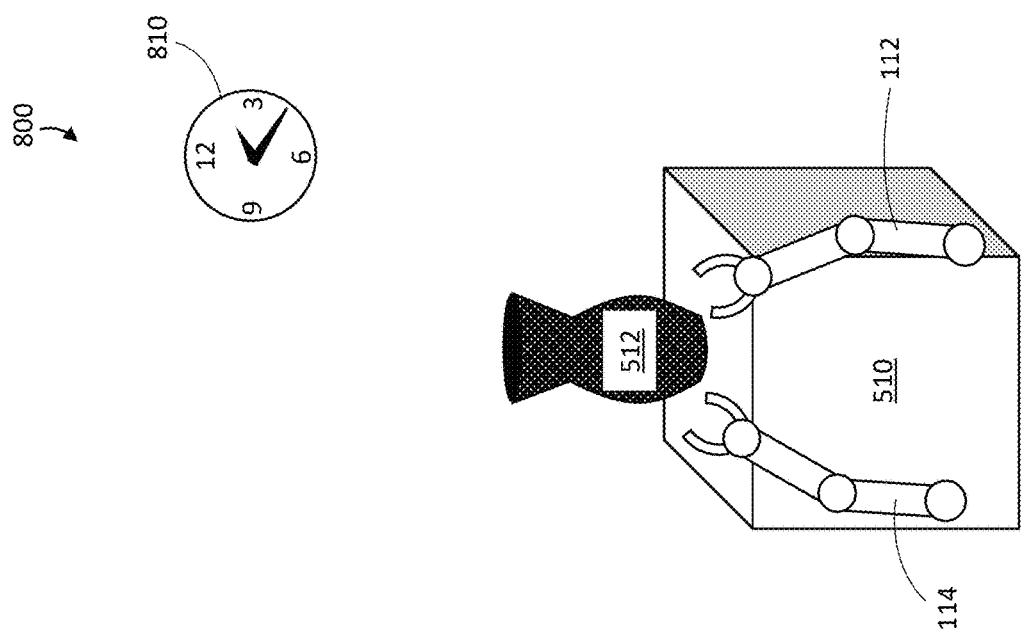

FIG. 8 shows an augmented environment instance 800 from the perspective of the robot body (an egocentric perspective, similar to as shown in FIG. 7). The example of FIG. 8 shows an augmentation where at least one visual virtual object is added to the environment template. FIG. 8 shows an example where the added visual virtual object is outside of an action path of the robot body. Throughout this disclosure, an "action path" of a robot body is a path in space by which at least a portion of the robot body will move when performing an action. Because the added virtual object is not real, it cannot actually affect the recorded motions of the robot body (as indicated in the action data accessed at 404 in method 400). If a virtual object were added in an action path of the robot body, this would result in poor training data, because the action data would indicate that the robot body moves through the virtual object, which is not possible. By adding a visual virtual object outside of an action path of the robot body, this situation is avoided.

In the example of FIG. 8, generating augmented environment instance 800 comprises adding wall clock 810 to the environment template. Wall clock 810 is a visual distraction that, while having no impact on the robot body's physical capability to pick up vase 512, still acts as a portion of input data to an LBM (during training) which receives image data encompassing wall clock 810. As a result, instance 800 acts as a valuable piece of training data, in that it will help to train an LBM to be flexible despite visual distractions.

FIG. 8 also is an example where the added visual virtual object is not pertinent to a work objective of the robot. That is, the presence of the wall clock 810 has no pertinence to the robot body picking up vase 512.

Figure 9:
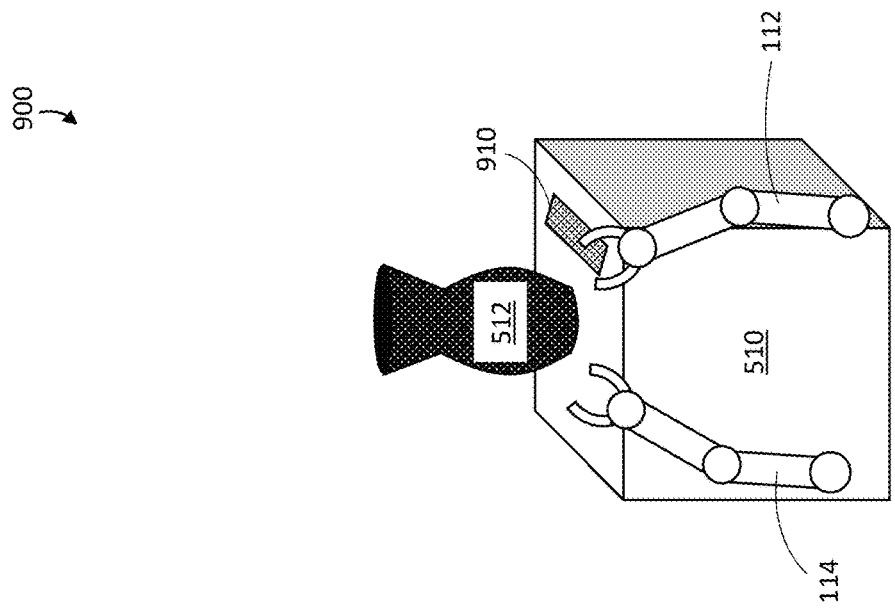
FIGS. 8, 9, 10, 11, 12, and 13 are scene views which show respective augmented environment instances.

FIG. 9 shows an augmented environment instance 900 from the perspective of the robot body (an egocentric perspective, similar to as shown in FIG. 7). The example of FIG. 9 shows another augmentation where at least one visual virtual object is added to the environment template. FIG. 9 shows an example where the added visual virtual object is outside of an action path of the robot body, and is not pertinent to a work objective of the robot. In the example of FIG. 9, generating augmented environment instance 900 comprises adding object 910 (a mobile device, in the example) to the environment template, to appear as though positioned on pedestal 510. In some implementations, a chroma key object could be positioned on a top surface of pedestal 510, to make augmentation of the pedestal easier. The chroma key object on the pedestal may be a different key (different color) than a background chroma key object (e.g. chroma key object 740 in FIG. 7), to maintain delineation between the pedestal and a background region). However, a chroma key object on pedestal 510 is not strictly necessary.

Object 910 is a visual distraction that, despite being positioned proximate vase 512, should not influence the robot body picking up vase 512. To this end, object 910 as added to the environment template should be selected to avoid conflicting with a work objective (or training objective) of the robot. In the example, if the objective is to train the robot to pick up a vase, then object 910 should not be another "vase". As another example, if the object is to train the robot to pick up the darkest object on a surface, object 910 should not be darker than vase 512.

Object 910 is included as a portion of input data to an LBM which receives image data encompassing object 910. As a result, instance 900 acts as a valuable piece of training data, in that it will help to train an LBM to be flexible despite visual distractions.

Figure 10:
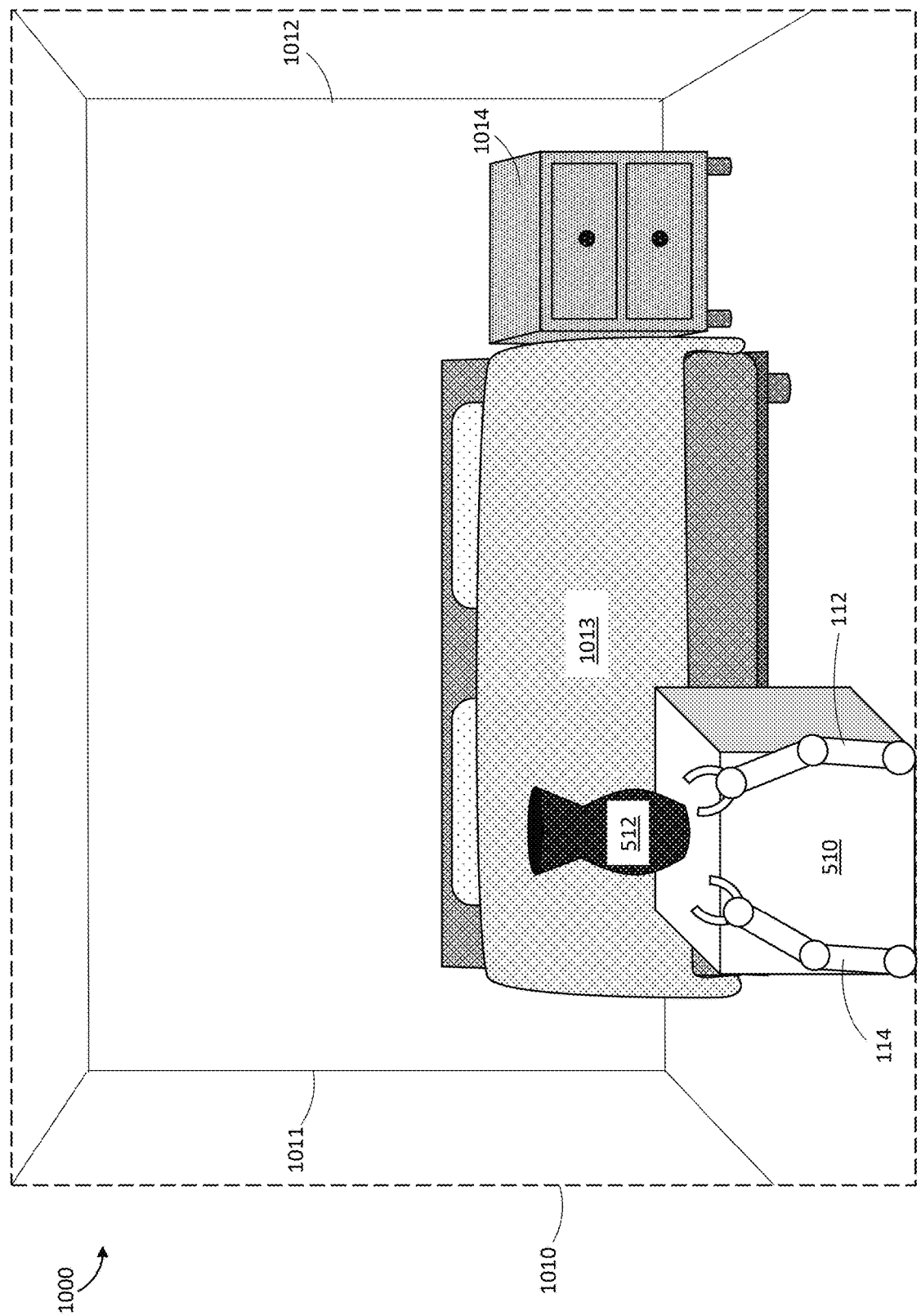

FIG. 10 shows an augmented environment instance 1000 from the perspective of the robot body (an egocentric perspective, similar to as shown in FIG. 7). The example of FIG. 10 shows an augmentation where a visual aspect of at least a portion of a background region of the environment template is changed. In particular, chroma key object 740 in FIG. 7 is replaced with a hotel room 1010, having corners 1011 and 1012, bed 1013, and nightstand 1014. By changing the background region of the environment template, the robot body is made to appear in a different type of environment, which results in further varied training data.

In some implementations, changing of the background region comprises excising (or ignoring or rendering transparent) an existing background region. This is particularly appropriate where a chroma key object is used, such that a single small color range can be identified as a background region of image data. A new background can then be inserted to appear behind the robot body. For example, a two-dimensional image of a hotel room can be applied as the new background.

As an alternative example, the robot body and any foreground objects (right arm 112, left arm 114, pedestal 510, and vase 512 in the example of FIG. 10) can be extracted from the image data, and applied over a background (e.g. by inserting the foreground objects over a background image, or inserting the foreground objects into a virtual environment having a rendered background).

Changing of a background region can be to any appropriate type of background, with non-limiting examples including a factory setting, an outdoor setting, an office setting, a store setting, etc.

Figure 11:
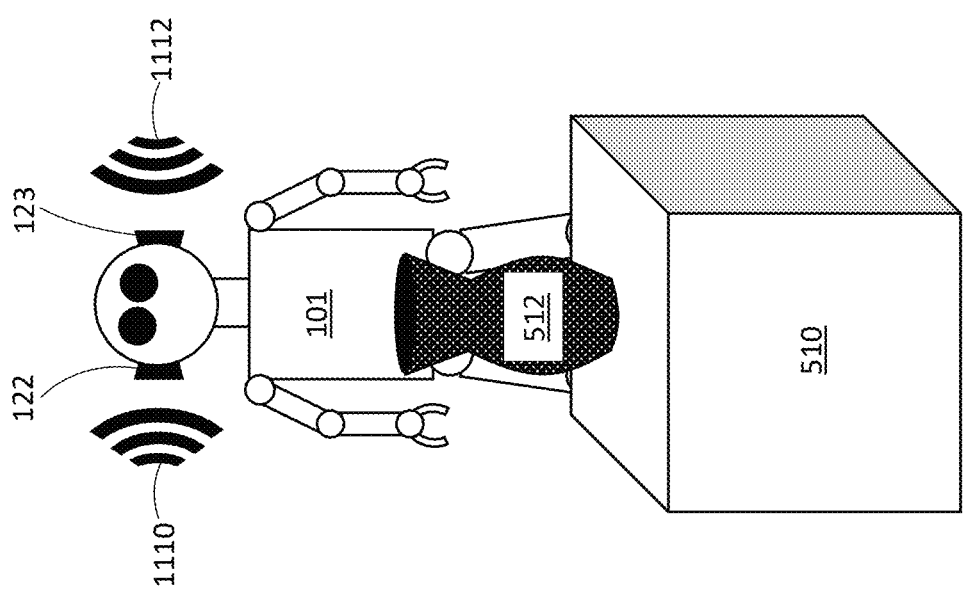

FIG. 11 shows an augmented environment instance 1100. The example of FIG. 11 shows an augmentation where at least one sound is added to the environment template. In particular, sounds 1110 and 1112 are added, as if captured by sensors 122 and 123. Sounds 1110 and 1112 can be any appropriate sounds, such as background noise corresponding to a particular environment. In some implementations, an augmentation can comprise removing at least one sound from the environment template (e.g. removing background noise from the environment template). While FIG. 11 is shown from a perspective separate from robot body 101, the augmentations can be egocentric (e.g. the augmentations can be applied as if sounds are captured by sensors 122 and 123).

Figure 12:
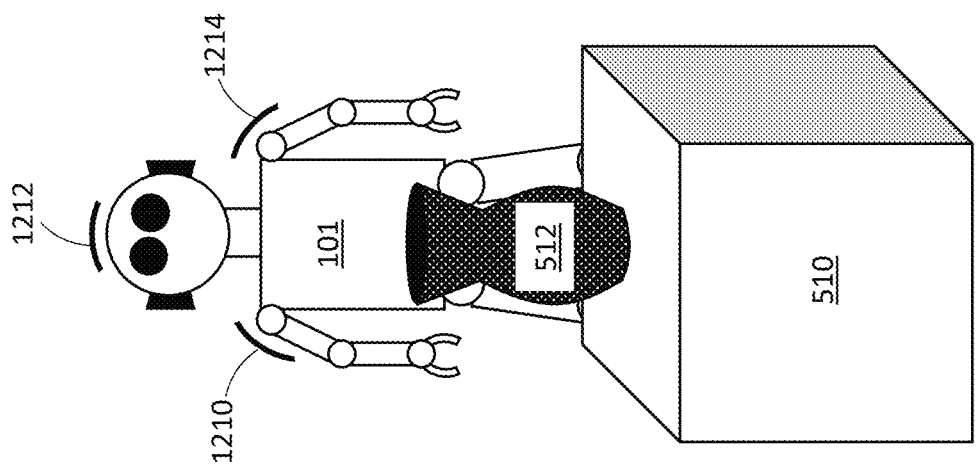

FIG. 12 shows an augmented environment instance 1200. The example of FIG. 12 shows an augmentation where at least one haptic feature is added to the environment template. In particular, haptic features 1210, 1212, and 1214 are added, as if captured by haptic sensors of robot body 101. Haptic features 1210, 1212, and 1214 can be any appropriate haptic features, such as rain or wind effects. In some implementations, an augmentation can comprise removing at least one haptic feature from the environment template (e.g. removing haptic noise from the environment template). While FIG. 12 is shown from a perspective separate from robot body 101, the augmentations can be egocentric (e.g. the augmentations can be applied as if haptic features are captured by haptic sensors of the robot body 101).

Figure 13:
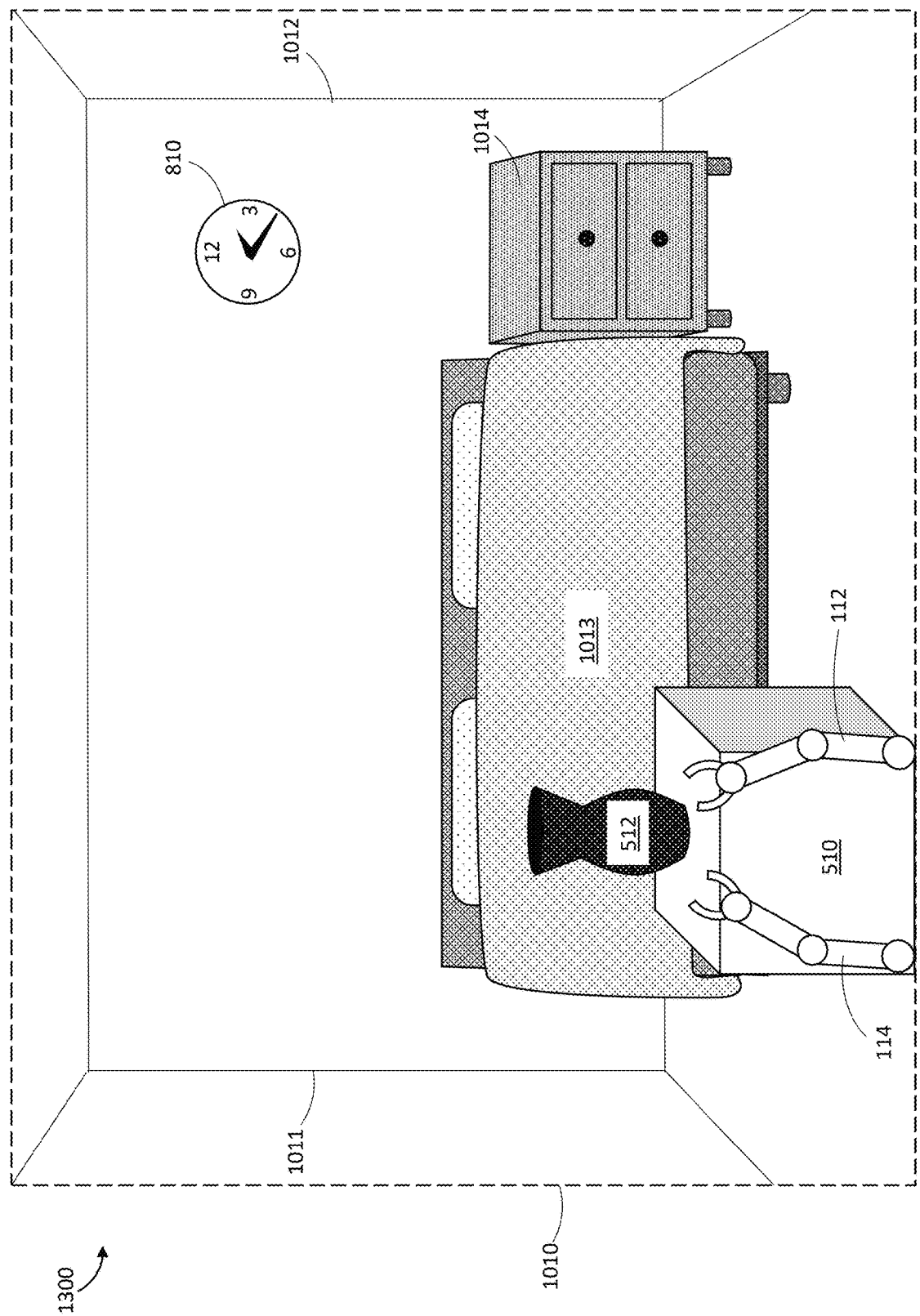

In some cases, a plurality of augmentations can be applied to the environment template, as shown for example in FIG. 13. FIG. 13 shows an augmented environment instance 1300, where a background region of the environment template has been changed to hotel room 1010 as discussed with reference to FIG. 10, and a wall clock 810 has been added as discussed with reference to FIG. 8. Further, though not visible in FIG. 13, the context data in this example was captured in a noisy environment; instance 1300 has been augmented to remove the background noise.

In order to generate a diverse variety of augmented environment instances, it is desirable to automate augmentation. To achieve this, a group of augmentation types can be defined (e.g. add visual object, change background, add/remove sound, add/remove haptic feature, as discussed above), as can possible augmentations of each type (e.g. a library of visual objects models or images which can be added, a library of backgrounds, a library of sounds, or a library of haptic features). Such definitions can be stored, for example, as a set of augmentation guidelines or an augmentation algorithm. At least one processor which is performing the augmentation can select (e.g., by running an augmentation program) a subset of one or more augmentations from the group of augmentation types, and then apply the selected subset of augmentations. In some implementations selection of the subset of augmentations (e.g. what augmentations, how many augmentations) can be random. In other implementations, selection of the subset of augmentations may be systematic (e.g. exhaustively enumerating through each possible permutation of augmentation type, and each possible combination of augmentations). Such definitions, augmentation guidelines, augmentation algorithms, augmentation types, possible augmentations, and/or augmentation programs can be included in a computer program product encompassing method 400. That is, processor-executable instructions or data can be stored on a non-transitory processor-readable storage medium, which when executed by at least one processor of a processor-based system cause the processor-based system to generate training data in accordance with method 400 in FIG. 4. These processor-executable instructions or data can include the exemplary set of definitions, augmentation guidelines, augmentation algorithms, augmentation types, possible augmentations, and/or augmentation programs discussed above.

When selecting the subset of augmentations, the at least one processor can also select an augmentation target in the environment template for each selected augmentation. "Augmentation target" in this context refers to what in the environment template is changed. For example, where the augmentation comprises adding a visual object, selecting the augmentation target comprises selecting a location in the environment where the object will be added. As another example, where the augmentation comprises changing at least a portion of the background region, selecting the augmentation target comprises identifying the background region and/or portion of the background region to be changed. As yet another example, where the augmentation comprises removing a sound or haptic feature, selecting the augmentation target comprises selecting the sound or haptic feature to be removed.

As discussed earlier with reference to FIGS. 5, 6, and 7, chroma key objects 540 and 740 result in the collection of chroma key context data. This chroma key context data corresponds to at least one augmentable region of the environment (e.g. acts as a "blank slate"). Conversely, context data representing features or objects which the robot body interacts during the at least one action can be referred to as "feature context data". Since this feature context data represents elements with which the robot body interacts, augmentation of regions represented by such feature context data should generally by avoided or minimized, as such augmentations could result in unrealistic training data which is counter productive in training the LBM (as discussed earlier).

In some implementations, generating the plurality of augmented environment instances based at least in part on the context data, as in act 410 of method 400, comprises: for each augmented environment instance, applying the at least one augmentation of at least one augmentable region of the environment. In one example, such an augmentation can comprise, for example, adding at least one virtual or "augmented reality" object to the at least one augmentable region of the environment. An example of this is shown in FIG. 8 discussed earlier, where wall clock 810 is added to a background region of the environment (e.g. a region of the environment corresponding to chroma key object 740 in FIG. 7). Another example is shown in FIG. 10 discussed earlier, where an augmentable region (background region corresponding to chroma key object 740 in FIG. 7) is replaced with different content.

Returning to method 400 in FIG. 4, at 412, a plurality of instances of training data are generated. Each instance of training data comprises the action data and a respective augmented environment instance. That is, each instance of training data is generated so as to represent the robot body performing the at least one action, in the augmented environment instance. In this way, a robust set of training data is generated where the at least one action appears to be performed in a variety of varying environments and circumstances.

The generated training data is used to train a machine learning model (e.g. an LBM), for example by behavior cloning or offline reinforcement learning.

As mentioned earlier, in some implementations generation of the training data is performed by virtual simulation. In particular, the robot body is a virtual representation in a virtual environment. In such implementations, the action data corresponds to at least one action performed by the robot body, as simulated in the virtual environment. In this regard, the action data is not "captured" by sensors, but is rather generated by simulation. That is, the action data may comprise simulated sensor data (representing what would have been sensed by real-world sensors). Alternatively, the action data can comprise movement data (e.g. rotation and translation vectors for members of the robot body) which indicates the movement of the robot body to perform the at least one action.

Further in virtual simulation implementations, the context data at least partially represents the virtual environment as simulated. In this regard, the context data is not "captured" by sensors, but is rather generated by simulation. That is, the context data may comprise simulated sensor data (representing what would have been sensed by real-world sensors). Alternatively, the context data can comprise spatial data (e.g. data indicating location and size of objects and features in the environment).

Based on simulated action data and context data, method 400 can be performed to augment the data and generate training data, as if the simulated action data and context data were data captured from the physical world.

As mentioned earlier, in order to record a robot performing an action (to collect the above discussed action data), the robot can be controlled by tele-operation, as discussed below with reference to FIG. 14.

Figure 14:
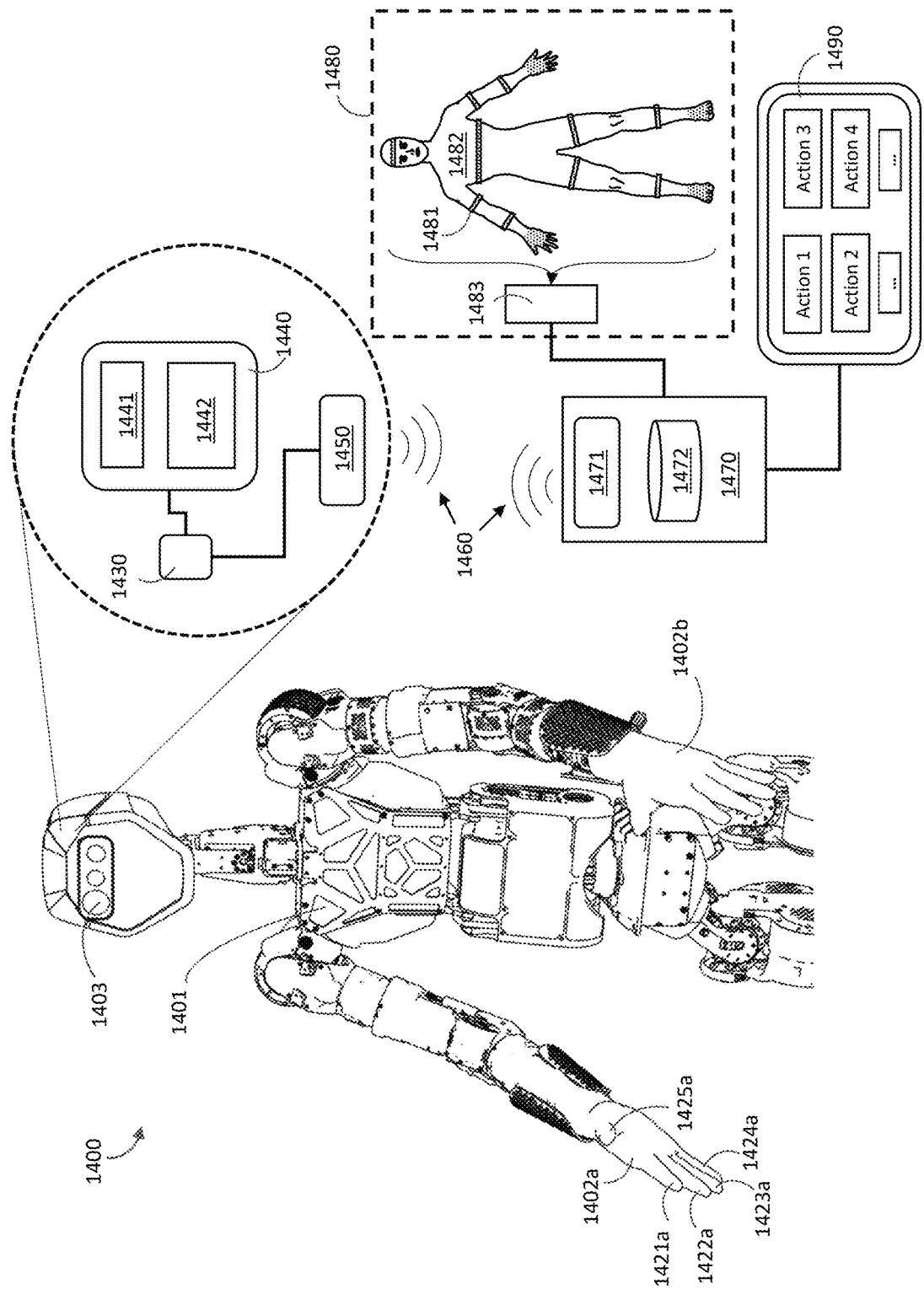
FIG. 14 is a schematic diagram of an exemplary robot tele-operation system.

FIG. 14 is an illustrative diagram of an exemplary robot system 1400 comprising various features and components similar to those described with reference to FIGS. 1, 2, and 3. Description of FIGS. 1, 2, and 3 is applicable to FIG. 14, and vice-versa, unless context dictates otherwise. Robot system 1400 comprises a robot body 1401 with a first physically actuatable component 1402*a* and a second physically actuatable component 1402*b* mechanically coupled to body 1401. In the illustrated implementation, first and second physically actuatable components 1402*a* and 1402*b* each correspond to a respective robotic hand, though a person of skill in the art will appreciate that in alternative implementations a physically actuatable component may take on other forms (such as an arm or leg, a non-hand-like end effector such as a cutter or suction tube, or any other form useful to the particular applications the robot is intended to perform). Robotic hand 1402*a* emulates a human hand and includes multiple fingers 1421*a*, 1422*a*, 1423*a*, and 1424*a* and an opposable thumb 1425*a*. Robotic hand 1402*b* is similar to a mirror-image of robotic hand 1402*a* while corresponding details are not labeled for robotic hand 1402*b* to reduce clutter. Robotic hands 1402*a* and 1402*b* may be physically actuatable by a variety of different means, including electromechanical actuation, cable-driven actuation, magnetorheological fluid-based actuation, and/or hydraulic actuation. Some exemplary details of actuation technology that may be employed to physically actuate robotic hands 1402*a* and 1402*b* are described in US Patent Publication No. 2022-0105645 and US Patent Publication No. 2022-0371183, both of which are incorporated by reference herein in their entirety.

Robot body 1401 further includes at least one sensor 1403 that detects and/or collects data about the environment and/or objects in the environment of robot system 1400. In the illustrated implementation, sensor 1403 corresponds to a sensor system including a camera, a microphone, and an inertial measurement unit that itself comprises three orthogonal accelerometers, a magnetometer, and a compass, though in other implementations any appropriate type of sensor could be included.

For the purposes of illustration, FIG. 14 includes details of certain exemplary components that are carried by or within robot body 1401 in accordance with the present robots, systems, computer program products, and devices. Such components include at least one processor 1430 and at least one non-transitory processor-readable storage medium, or "memory", 1440 communicatively coupled to processor 1430. Memory 1440 can store processor executable instructions 1442 to cause robot body 1401 to selectively and autonomously perform at least one action. Depending on the specific implementation, processor-executable instructions 1442 may further include processor-executable instructions (e.g., a computer program product) that cause robot system to perform method 400 described herein or similar methods.

Processor 1430 is also communicatively coupled to a wireless transceiver 1450 via which robot body 1401 sends and receives wireless communication signals 1460 with an exemplary teleoperation system 1470. To this end, teleoperation system 1470 also includes a wireless transceiver 1471.

For the purposes of illustration, teleoperation system 1470 includes both a low-level teleoperation interface 1480 and a high-level teleoperation interface 1490. Low-level teleoperation interface 1480 includes a sensor system 1481 that detects real physical actions performed by a human pilot 1482 and a processing system 1483 that converts such real physical actions into low-level teleoperation instructions that, when executed by processor 1430, cause robot body 1401 (and any applicable actuatable components such as hands 1402*a* and/or 1402*b*) to emulate the physical actions performed by pilot 1482. In some implementations, sensor system 1481 may include many sensory components typically employed in the field of virtual reality games, such as haptic gloves, accelerometer-based sensors worn on the body of pilot 1482, and a VR headset that enables pilot 1482 to see optical data collected by sensor 1403 of robot body 1401. High-level teleoperation interface 1490 includes a simple GUI displayed, in this exemplary implementation, on a tablet computer. The GUI of high-level teleoperation interface 1490 provides a set of buttons each corresponding to a respective action performable by robot body 1401 (and applicable actuatable components such as hands 1402*a* and/or 1402*b*). Action(s) selected by a user/pilot of high-level teleoperation interface 1490 through the GUI are converted into high-level teleoperation instructions that, when executed by processor 1430, cause robot body 1401 (and any applicable actuatable components such as hands 1402*a* and/or 1402*b*) to perform the selected action(s).

Teleoperation system 1470 is also shown as including at least one non-transitory processor-readable storage medium (memory) 1472, which can store processor-executable instructions which when executed by processor 1471 cause teleoperation system 1470 to function.

Teleoperation system 1470 can be implemented in a distributed manner. For example, memory 1472 can be at a server location remote from low-level teleoperation interface 1480 and/or remote from high-level teleoperation interface 1490. As another example, low-level teleoperation interface 1480 can be remote from high-level teleoperation interface 1490.

Robot system 1400 in FIG. 14 is illustrated such that the robot generally emulates or mimics human anatomy. However, this is not necessarily the case, and any appropriate form of robot could be used. In some implementations, a robot may only partially emulate human anatomy (e.g. the robot may only include a limited subset of human-like features), or a robot may not emulate human anatomy at all.

In some implementations of the present systems, methods, and computer program products, a library of robot training data may be generated by repeatedly: i) collecting robot performance data (i.e., an instance of robot action data together with context data) while the robot performs a task; and ii) replicating the robot performance data with each respective copy including a respective distinctive augmentation as described herein. In other words, method 400 may be carried out including optional acts 402 and 406. However, in other implementations of the present systems, methods, and computer program products, an existing library of robot training data may be amplified using augmentations as described herein to produce a larger library of robot training data that, when used to train an LBM or LAM, may result in more robust behavior cloning or autonomous task performance. That is, method 400 may be carried out on an existing library of robot training data by omitting optional acts 402 and 406, accessing the existing library of robot training data, and amplifying the existing library of robot training data by replicating and augmenting data instances as described herein.

The systems, methods, and computer program products described herein may, in some implementations, employ any of the teachings of the present systems, methods, control modules, and computer program products include, without limitation, the general-purpose humanoid robots developed by Sanctuary Cognitive Systems Corporation, various aspects of which are described in U.S. patent application Ser. No. 18/375,943, U.S. patent application Ser. No. 18/513,440, U.S. patent application Ser. No. 18/417,081, U.S. patent application Ser. No. 18/424,551, U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/316,693, U.S. Provisional Patent Application Ser. No. 63/253,591, U.S. Provisional Patent Application Ser. No. 63/293,968, U.S. Provisional Patent Application Ser. No. 63/293,973, and/or U.S. Provisional Patent Application Ser. No. 63/278,817, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present robots, robot systems and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method comprising:
   accessing action data, the action data comprising sensor data recorded by at least one sensor of a robot body as the robot body performs a task and the sensor data including movement data that defines an action path in space through which at least one actuatable member of the robot body moves as the robot body performs the task;
   accessing context data, the context data at least partially representing an environment in which the robot body performs the task, wherein the context data includes chroma key context data corresponding to at least one augmentable region of the environment outside of the action path of the robot body based on the action data;
   generating, by at least one processor, a plurality of augmented environment instances based at least in part on the context data, each augmented environment instance different from the environment of the robot body and from other augmented environment instances in the plurality of augmented environment instances in at least one aspect, wherein generating the plurality of augmented environment instances based at least in part on the context data comprises, for at least one augmented environment instance, adding at least one visual virtual object to at least one augmentable region of the environment outside of the action path of the robot body based on the action data; and
   generating, by the at least one processor, a plurality of instances of training data for training at least one model to control autonomous movement of the robot body as the robot body performs the task, each instance of training data comprising the action data and a respective augmented environment instance of the plurality of augmented environment instances.

2. The method of claim 1, further comprising capturing, by at least one sensor of the robot body, the action data.

3. The method of claim 1, wherein the sensor data is recorded by at least one sensor selected from a group of sensors consisting of:
   an image sensor which captures image data representing at least a portion of the robot body;
   a movement sensor which captures the movement data for at least one actuatable member of the robot body;
   a proprioceptive sensor which captures proprioceptive data for at least one actuatable member of the robot body;
   an inertial sensor which captures inertial data for at least one actuatable member of the robot body; and
   a force sensor which captures force data for at least one actuatable member of the robot body.

4. The method of claim 1, wherein the action data comprises at least one action instruction or at least one action description indicative of the specific task.

5. The method of claim 1, further comprising capturing, by at least one sensor, the context data.

6. The method of claim 1, wherein the environment of the robot body is a physical environment, and the context data comprises sensor data at least partially representing the physical environment of the robot body, the sensor data captured by at least one sensor selected from a group of sensors consisting of:
   an image sensor which captures image data representing the physical environment;
   an image sensor which captures image data representing at least a portion of the robot body;
   an image sensor which captures image data representing the physical environment from the perspective of the robot body;
   a haptic sensor which captures haptic data representing contact between the robot body and the physical environment;
   an audio sensor which captures audio data representing sound in the physical environment;
   an infrared sensor which captures infrared data representing the physical environment; and
   a LIDAR sensor which captures LIDAR data representing the physical environment.

7. The method of claim 1, wherein the context data at least partially represents the environment of the robot body and the robot body in the environment.

8. The method of claim 1, wherein generating the plurality of augmented environment instances based at least in part on the context data comprises, with the environment at least partially represented in the context data as an environment template:
   for at least one augmented environment instance, applying at least one augmentation to the environment template, the at least one augmentation selected from a group of augmentations consisting of:
   adding at least one sound to the environment template;
   removing at least one sound from the environment template;
   adding at least one haptic feature to the environment template; and
   removing at least one haptic feature from the environment template.

9. The method of claim 1, wherein generating, by at least one processor, a plurality of augmented environment instances based at least in part on the context data comprises, for each augmented environment instance:
   autonomously selecting an augmentation target in the environment; and
   autonomously applying at least one augmentation to the augmentation target.

10. The method of claim 1, wherein the context data further includes feature context data corresponding to at least one non-augmentable region of the environment, the feature context data corresponding to at least a portion of the robot body or at least a portion of an object which the robot body interacts with during the task.

11. The method of claim 1, wherein:
the environment of the robot body is a virtual environment;
the action data corresponds to a task performed by the robot body as simulated in the virtual environment; and
the context data at least partially represents the virtual environment.

12. A computer program product comprising at least one non-transitory processor-readable storage medium storing processor-executable instructions or data that, when executed by at least one processor of a processor-based system, cause the processor-based system to:
access action data, the action data comprising sensor data recorded by at least one sensor of a robot body as the robot body performs a task and the sensor data including movement data that defines an action path for at least one actuatable member of the robot body as the robot body performs the task;
access context data, the context data at least partially representing an environment in which the robot body performs the task, wherein the context data includes chroma key context data corresponding to at least one augmentable region of the environment outside of the action path of the robot body based on the action data;
generate, by the at least one processor, a plurality of augmented environment instances based at least in part on the context data, each augmented environment instance different from the environment of the robot body and from other augmented environment instances in the plurality of augmented environment instances in at least one aspect, wherein the processor executable instructions or data which cause the processor-based system to generate the plurality of augmented environment instances based at least in part on the context data cause the at least one processor to, for at least one augmented environment instance, add at least one visual virtual object to at least one augmentable region of the environment outside of the action path of the robot body based on the action data; and
generate, by the at least one processor, a plurality of instances of training data for training at least one model to control autonomous movement of the robot body as the robot body performs the task, each instance of training data comprising the action data and a respective augmented environment instance of the plurality of augmented environment instances.

13. The computer program product of claim 12, wherein the processor executable instructions or data which cause the processor-based system to generate the plurality of augmented environment instances based at least in part on the context data cause the at least one processor to, with the environment of the robot body at least partially represented in the context data as an environment template:
for at least one augmented environment instance, apply at least one augmentation to the environment template, the at least one augmentation selected from a group of augmentations consisting of:
adding at least one sound to the environment template;
removing at least one sound from the environment template;
adding at least one haptic feature to the environment template; and
removing at least one haptic feature from the environment template.

14. The computer program product of claim 13, wherein the processor-executable instructions or data which cause the at least one processor to generate a plurality of augmented environment instances based at least in part on the context data cause the at least one processor to, for each augmented environment instance:
autonomously select an augmentation target in the environment; and
autonomously apply at least one augmentation to the augmentation target.

15. The computer program product of claim 12, wherein the context data further includes feature context data corresponding to at least one non-augmentable region of the environment, the feature context data corresponding to at least a portion of the robot body or at least a portion of an object which the robot body interacts with during the task.

16. The method of claim 1 wherein the augmentable region of the chroma key context data corresponds to a chroma key object in the environment in which the robot body performs the task.

17. The computer program product of claim 12 wherein the augmentable region of the chroma key context data corresponds to a chroma key object in the environment in which the robot body performs the task.

18. The method of claim 1 wherein the movement data includes rotation vectors and translation vectors for members of the robot body collected by encoders positioned at joints or members of the robot body.

19. The computer program product of claim 12 wherein the movement data includes rotation vectors and translation vectors for members of the robot body collected by encoders positioned at joints or members of the robot body.

\* \* \* \* \*